C. W. MEEK.
LIQUID METER.
APPLICATION FILED JULY 30, 1908.

950,752.

Patented Mar. 1, 1910.

Witnesses.

Inventor,
Charles W. Meek,
By
Attorney.

UNITED STATES PATENT OFFICE.

CHARLES W. MEEK, OF LOS ANGELES, CALIFORNIA.

LIQUID-METER.

950,752. Specification of Letters Patent. Patented Mar. 1, 1910.

Application filed July 30, 1908. Serial No. 446,061.

*To all whom it may concern:*

Be it known that I, CHARLES W. MEEK, a citizen of the United States, residing in the city of Los Angeles, county of Los Angeles, and State of California, have invented new and useful Improvements in Liquid-Meters, of which the following is a specification.

My invention relates to that class of apparatus designed for measuring and registering the volume of liquid passing through the same, and the object thereof is to produce a meter that will register the volume of fluid passing through the same under all pressures with absolute accuracy.

My improved liquid meter is composed essentially of a casing divided into two chambers of like and predetermined capacities having inlet and outlet ports controlled by valves operated by floats, said ports and valves and floats being so arranged, constructed and operated that when the inlet port of one chamber is open its outlet port is closed and the inlet port of the other chamber is closed and the outlet port is opened, and float mechanism in each of said chambers adapted to operate the registering mechanism only upon the flow of liquid out of said chambers, and locking mechanism to retain the inlet port of one of the chambers open and its outlet port closed until the chamber is nearly filled with liquid, while the inlet port of the other chamber is held closed and the outlet port open.

Figure 1:
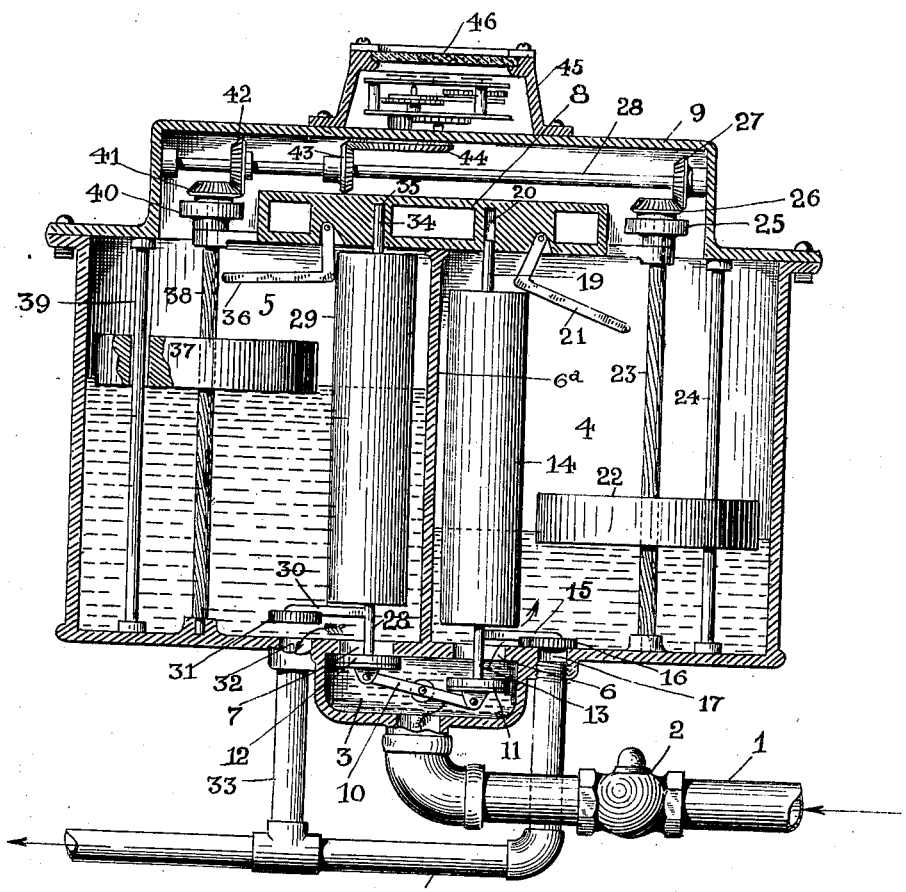
Figure 2:
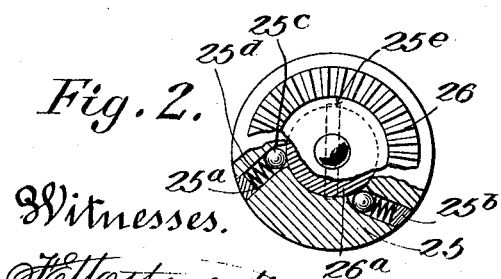
Figure 3:
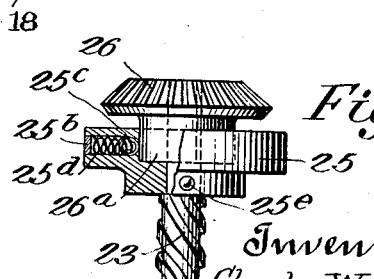

In the drawings forming a part of this application Figure 1 is a central vertical section of the casing of the meter, with certain of the parts in section. Figs. 2 and 3 are detailed views of certain of the clutches, parts being broken away for clearness of illustration.

In the drawings 1 is the liquid supply pipe which is preferably provided with a check valve 2 to prevent back flow therethrough. The supply pipe opens into the distributing chamber 3 which is secured upon the bottoms of the measuring chambers 4 and 5 which are connected by inlet ports 6 and 7 with the supply chamber. Chambers 4 and 5 are separated by partition 6ª which extends upwardly to web 8 which is secured to the top portion or cover 9 of the casing of the meter. Pivoted at its center in the supply chamber is the valve bar 10 which is pivotally connected at its ends to the valves 11 and 12 which control the inlet ports 6 and 7. Valve 11 is provided with a stem 13 which is secured upon the bottom of valve float 14. Stem 13 has an arm 15 which carries a valve 16 that controls the outlet port 17 from chamber 4. A pipe 18 connects port 17 to a place of use not shown. Float 14 has a guide stem 19 at the top thereof which reciprocates in a guide hole 20 in web 8. A locking lever 21 is mounted in web 8 in such position that when the liquid is out of chamber 4 it will swing into the path of movement of float 14 and hold the float against rising until the measuring float 22 engages the same and withdraws it from above the valve float. The measuring float is mounted upon a revoluble threaded shaft 23 and upon a guide shaft 24. Shaft 23 passes in threaded contact through float 22 and as said float rises and falls it rotates shaft 23. Upon the top of shaft 23 is a clutch 25 which is so constructed that it is locked to the hub of bevel gear 26 when shaft 23 is rotated by the fall of float 22, and is unlocked from the hub of said gear when shaft 23 is rotated by the rise of float 22. In the body 25 of the clutch are tangential holes 25ª the outer ends of which are closed by plugs 25ᵇ. In these holes are balls 25ᶜ, and between the balls and the plugs are spiral springs 25ᵈ. These springs hold the balls in contact with the hub 26ª of gear 26, and when the shaft is rotated by the falling of the float these balls lock the gear to the clutch body and cause the gear to rotate as shaft 23 is rotated, the clutch body being secured to said shaft by pin 25ᵉ. Gear 26 meshes with bevel gear 27 which is secured upon shaft 28 revolubly mounted in cover 9.

Valve 12 is provided with a stem 28 which is secured upon the bottom of valve float 29 in chamber 5. Stem 28 has an arm 30 which carries a valve 31 that controls the outlet port 32 of chamber 5. A pipe 33 connects port 32 with pipe 18. Float 29 has a guide stem 34 at the top thereof which reciprocates in a guide hole 35 in web 8. A locking lever 36 is mounted in web 8 in such position that when the liquid is out of chamber 5 it will swing into the path of movement of float 29 and hold the float against rising until the measuring float 37 engages the same and withdraws it from above the valve float. Measuring float 37 is mounted on a revoluble threaded shaft 38 and upon a guide shaft 39. Shaft 38 passes in threaded contact through float 37 and as said float rises and falls it rotates shaft 38. Upon the top of shaft 38 is a clutch 40 which is so constructed that it is locked to the hub of bevel gear 41 when shaft 38 is rotated by the fall of float 37, and is unlocked from the hub of said gear when shaft 38 is rotated by the rise of float 37. Clutch 40 is constructed in all particulars like clutch 25. Gear 41 meshes with bevel gear 42 which is secured upon shaft 28. Shaft 28 also carries a bevel gear 43 which meshes with a master gear 44 of a train of wheels which constitute a registering device and is of any approved construction. This train of wheels is in a casing 45 which is secured upon the top of cover 9 and is provided with a transparent panel 46 in the top thereof so that the register may be readily inspected and read. In the construction of my meter all joints must be air tight as the measuring chambers are in communication above partition 6, so that it is necessary to retain the air in said casing whenever the delivery pipe delivers the liquid at a point higher than the position of the meter. It is also necessary that the air pressure be retained in the meter to prevent one of the measuring chambers from filling too full until the other chamber has been emptied to the required degree.

From this construction it will be seen that the measuring chambers are alternately subjected to pressure and are alternately discharged, and the inflow in one chamber is automatically stopped whenever the discharge from the other chamber is stopped as soon as the air is compressed in the chambers to the pressure of the inflowing liquid. It will be further observed that the registering mechanism is only operated by the fall of the float in the chamber from which the liquid is being drawn, and that it is the fall of the float which operates the registering mechanism, so that every drop of liquid that is drawn out permits the float to fall the distance that before was occupied by such amount of liquid. It will be also observed that the shifting of the flow of liquid from one measuring chamber to the other takes place when one of the chambers is practically empty and the other is practically full, and that the weight of the valve float of the empty chamber is added to the buoyant lifting power of the valve float in the practically full chamber to make such change.

Having described my invention what I claim is:

1. A liquid meter comprising a distributing chamber and two measuring chambers, said measuring chambers being each connected by a port with the distributing chamber and each having a discharge port; valve floats in said measuring chambers; valves carried by said floats and adapted to control the ports from the distributing chamber to the measuring chambers; other valves connected to said valve floats for controlling the discharge ports from said measuring chambers, said valves being so arranged and connected that when the valve controlling the discharge in one chamber is closed its inlet port is open and the discharge port of the other chamber is open and its inlet valve is closed; means for locking the valve floats in position to close the inlet port of one chamber and the outlet port of the other chamber; a measuring float in each of said measuring chambers; said measuring floats on the rise thereof to near the top of the measuring chambers being adapted to contact with and release the locks of the valve floats; a registering device; connections from said registering device to said measuring floats, said connections being so arranged that the registering devices are operable only on the fall of the float.

2. A liquid meter divided into two air tight measuring chambers connected at the top and having inlet and discharge ports in the bottom thereof; valves controlling said ports, said valves being so arranged and connected together that the inlet port in one chamber is open and the discharge port closed, while the discharge port is open and the inlet port closed in the other chamber; a registering mechanism; measuring floats in said measuring chambers operatively connected to the registering mechanism in such manner as to operate said registering mechanism only on the fall of the floats, valve floats in said measuring chambers for controlling the valves governing the inlet and discharge therefrom; means to alternately lock said valve controlling mechanism; said measuring floats providing means to alternately unlock said locking means.

3. A meter comprising a distributing chamber and two measuring chambers having ports connecting them with the distributing chamber and having discharge ports, said ports being in the bottoms of said measuring chambers; two valves in said distributing chamber; a bar pivotally connected at its ends to said valves and pivotally connected at its center to the distributing chamber; valve stems connected to said valves and projecting through the ports into the measuring chambers; valve floats secured upon said stems; other valves connected to said stems and controlling the discharge ports from said measuring chambers; other floats in said measuring chambers; threaded shafts passing through said last floats in threaded contact therewith, said threaded shafts being revoluble; guide shafts passing through said last floats; clutch mechanism secured upon the top of said threaded shafts; bevel gears mounted to be engaged by said clutch mechanism and locked thereto when said threaded shafts are operated by the downward movement of the floats and to be unlocked therefrom when the shafts are rotated by the upward movement of the floats; a web in the upper part of the casing having guide holes therein; guide stems secured to the valve floats and reciprocating in said guide holes; L-shaped locking levers pivoted to said web and adapted to swing into the line of movement of the valve float when the chamber containing the same is empty and to lock the float against upward movement; a horizontal shaft carrying three bevel gear wheels, two of which mesh with the gear wheels operated by the clutches; a registering mechanism having a master wheel, said master wheel meshing with the gear wheel on the horizontal shaft; pipes connecting the discharge ports with the place of use; and a supply pipe leading into said distributing chamber.

In witness that I claim the foregoing I have hereunto subscribed my name this 23rd day of July, 1908.

CHARLES W. MEEK.

Witnesses:
G. E. HARPHAM,
S. B. AUSTIN.